US007211290B2

(12) United States Patent
Joret et al.

(10) Patent No.: US 7,211,290 B2
(45) Date of Patent: May 1, 2007

(54) SURFACE-MODIFIED METHYL METHACRYLATE POLYMER BASED TRANSPARENT SHEET MATERIAL

(75) Inventors: Laurent Joret, Paris (FR); Pierre Chaussade, Orleans (FR); Yves Naoumenko, Bray en Val (FR)

(73) Assignee: Saint-Gobain Glass France, Courbevoie (FR)

( * ) Notice: Subject to any disclaimer, the term of this patent is extended or adjusted under 35 U.S.C. 154(b) by 0 days.

(21) Appl. No.: 10/483,570

(22) PCT Filed: Jul. 10, 2002

(86) PCT No.: PCT/FR02/02415

§ 371 (c)(1),
(2), (4) Date: Jul. 20, 2004

(87) PCT Pub. No.: WO03/006538

PCT Pub. Date: Jan. 23, 2003

(65) Prior Publication Data

US 2004/0247885 A1 Dec. 9, 2004

(30) Foreign Application Priority Data

Jul. 13, 2001 (FR) ................... 01 09732

(51) Int. Cl.
*C08J 7/12* (2006.01)
*B29C 73/00* (2006.01)
*B64C 1/14* (2006.01)

(52) U.S. Cl. .............. 427/140; 427/163.1; 427/255.39; 427/490

(58) Field of Classification Search ................ 427/140, 427/163.1, 255.39, 490
See application file for complete search history.

(56) References Cited

U.S. PATENT DOCUMENTS 5,310,571 A * 5/1994 Meadows .................. 427/2.31

FOREIGN PATENT DOCUMENTS

| DE | 295 02 546 | 5/1995 |
| JP | 61-162008 | 7/1986 |

OTHER PUBLICATIONS

PTO 2006-3349, Translation of the German Document 295 02 546; Publication Date May 18, 1995.*
PTO 2006-3322, Translation of Japanese Document JP 61-162008; Publication Date Jul. 22, 1986.*

* cited by examiner

*Primary Examiner*—D. S. Nakarani
(74) *Attorney, Agent, or Firm*—Oblon, Spivak, McClelland, Maier & Neustadt, P.C.

(57) ABSTRACT

A transparent, monolithic or laminated sheet material based on a methyl methacrylate homopolymer or copolymer, the laminated material having at least one of its two outer layers made of the methyl methacrylate homopolymer or copolymer, characterized in that the monolithic sheet of methyl methacrylate homopolymer or copolymer or at least one outer layer of methyl methacrylate homopolymer or copolymer of the laminated sheet has, in the region of the surface, over a depth of at least 50 nanometers from the surface, an increase in its average density of 0.1 to 1 g/cm$^3$, the average density being determined by X-ray reflectometry.

7 Claims, 1 Drawing Sheet

SURFACE-MODIFIED METHYL METHACRYLATE POLYMER BASED TRANSPARENT SHEET MATERIAL

BACKGROUND OF THE INVENTION

1. Field of the Invention

Figure 1:
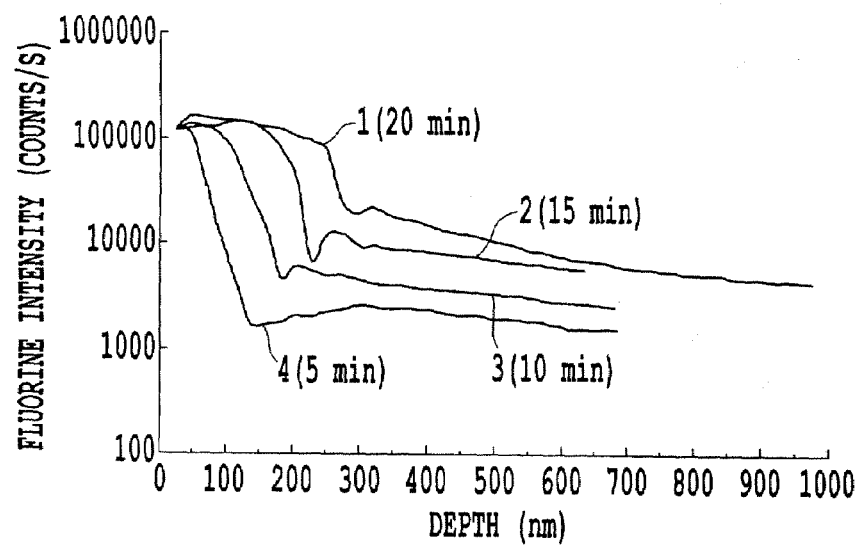

The present invention relates to improving the properties, in particular the crazing resistance, of transparent, acrylic, monolithic or laminated sheet materials, based on a methyl methacrylate homopolymer or copolymer, in particular polymethyl methacrylate homopolymer (PMMA). It also relates to these materials having improved properties, to glazing, in particular aircraft glazing based on these materials, to a process for treating a conventional material of this type so as to improve the properties thereof and, in general, to a process for improving the properties of these materials.

2. Description of the Background

In the description which follows, we will usually refer to the outer panels of airplane windows, which represent the preferred application of the present invention, but it goes without saying that it is not limited to aircraft glazing (windows, windshields, helicopter canopies, cockpit sides) and that it encompasses all other possible applications of these sheet materials based on PMMA or the like: glazing of all types, canopies, etc.

At the present time windows are manufactured from drawn PMMA. The drawing strengthens the PMMA material, in particular against notch propagation, and increases the crazing resistance. The use of this material is justified by a good mechanical strength/weight ratio and relatively easy processing: peripheral machining of monolithic sheets and mounting them as double glazing in a silicone seal.

However, the surface resistance of this drawn acrylic material remains relatively poor: abrasion, scratching, crazing and appearance of cracks degrade the optical quality of the window, as the outer skin, and in certain types of lighting prevents vision. At this stage, the windows must be removed—an expensive operation—in order either to be repaired by machining or to be replaced. The current situation has two consequences for airlines: lack of passenger comfort and negative brand image when a window is highly degraded; extra cost to repair and/or replace it.

Since 1980, there have been several crazing crises affecting most large airlines and resulting in windows having to be replaced after 2000 hours of flying compared with 10 000 to 15 000 hours of flying in normal weather. Hypotheses have been put forward to explain these crises:

The main origin of crazing (a major phenomenon with pressurized aircraft) is due to a water absorption/desorption phenomenon on the outer surface of the window, this phenomenon being magnified by the following cycles:

atmospheric pressure+high ground humidity: water absorption;

low pressure+low humidity at 10 000 m: water desorption.

This water ingress/egress phenomenon has by itself little effect on the life of the window, as it leads to an equilibrium in the water concentration. However, the water has an affinity for the constituent polymer of the window, (acting as a "plasticizer") and will "dissolve" in the polymer and then diffuse therein. However, during this absorption/desorption phenomenon and this diffusion, the water entrains with it sulfuric acid—a powerful oxidizing agent—whose concentration in the air is very greatly increased in the case of volcanic eruptions, which are not so rare. Water desorption can then be accelerated by the sulfuric acid which acts as a dessicant and results in high stresses leading to crazing. The surface of the window is also subjected to fitting stresses. By therefore being subjected to deformation and volume variations, and thus stressed in the presence of sulfur derivatives, the surface of the window inevitably undergoes this crazing.

To overcome this disadvantage that the drawn PMMA material has, of thus leading to crazing, two types of solutions have been proposed hitherto:

(1) the selection of an acrylic raw material of very high quality, which is highly crosslinked, and therefore has a low water absorption, combined with very high surface quality obtained by polishing after stress-free diamond machining;

(2) protective varnishes which are abrasion-resistant and eliminate any risk of crazing, since they exhibit little or no exchange with water, these varnishes possibly being soft (polyurethane) or hard (polysiloxane); or else protective films which also form a physical barrier with respect to the window.

Solution (1) is not entirely satisfactory.

Nor, in the case of high sulfuric acid pollution levels, is solution (2) any more satisfactory because of the presence of a "thickness", the surface optical quality being inferior to that of a bare window. In addition, the varnish is deposited using flow-coating or spraying techniques, which operations are made complex by the need to also protect the edge of the window in the recessing. Moreover, the varnishing must necessarily be carried out in a clean (class 1000) room since dust on the surface at the time of application will generate a major optical defect (tent peg, harl, etc.) which is particularly visible by the magnifying glass effect. The varnishes can be neither repaired nor regenerated, making it necessary when the surface has degraded to remachine it.

Thus, the application of a film or varnish involves an extra cost which it is desired to avoid.

SUMMARY OF THE INVENTION

To solve this crazing problem, the filing company has sought a treatment capable of maintaining a surface optical quality identical to that of a bare window, capable of being carried out at low cost, and also capable of being renewed at low cost, in other words allowing the reworking of parts, without relying on manual and individual operations, which is the case with the use of films or varnishes.

The filing company has therefore discovered that, by modifying the material itself in order to make it denser at least on its surface, the problem posed can be solved whilst avoiding the drawbacks of detached films and varnishes, as well as optical perturbations at the interfaces.

The subject of the present invention is therefore firstly a monolithic or laminated, transparent sheet material based on a methyl methacrylate homopolymer or copolymer, the laminated material having at least one of its two outer layers made of the methyl methacrylate homopolymer or copolymer, characterized in that the monolithic sheet material of methyl methacrylate homopolymer or copolymer or at least one outer layer of methyl methacrylate homopolymer or copolymer of a laminated sheet material has, in the region of the surface, over a depth of at least 50 nanometers from the surface, an increase in its average density of 0.1 to 1 g/cm$^3$, in particular 0.1 to 0.4 g/cm$^3$, the average density being determined by X-ray reflectometry.

DETAILED DESCRIPTION OF THE PREFERRED EMBODIMENTS

Preferably, the material is based on PMMA. However, it is not excluded for it to be made of a methyl methacrylate copolymer.

The term "methyl methacrylate copolymer" is understood to mean a copolymer obtained from a monomer composition comprising at least 50 mol % of methyl methacrylate, the remaining monomers being chosen from any copolymerizable monomer capable of resulting in sheets having the required mechanical and optical properties.

As examples of polymerizable comonomers, mention may be made of methacrylic acid, methyl acrylate, Na methyl acrylate, hydroxyethyl methacrylate, vinylpyrrolidone, siloxane (meth)acrylates such as those of formulae:

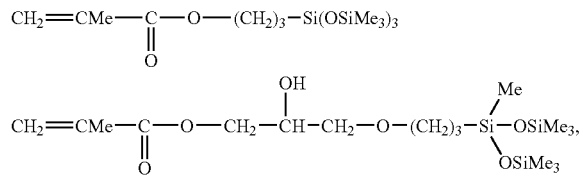

and fluorinated (meth)acrylates, such as those of formulae:

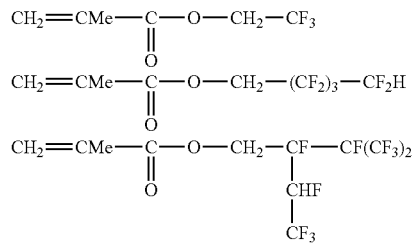

(Me=methyl);

mention may also be made of crosslinking monomers which may be present in small amounts, such as triethylene glycol dimethacrylate (TEDMA) and ethylene glycol dimethacrylate (EGDMA).

The laminated sheet materials are those consisting of a stack of several sheets or plates, such as those in which a sheet of polyvinyl butyral or polyurethane (generally with a thickness of between 0.3 and 2 mm) is sandwiched between two PMMA sheets.

Moreover, the sheets forming the subject of the present invention, both monolithic and laminated, may be flat, domed or curved.

It should also be emphasized that the density of the starting PMMA is close to 1.1 g/cm$^3$. There is therefore a significant increase in the density of the PMMA surface.

According to one particular embodiment of the present invention, the material was subjected to a treatment capable of densifying it on the surface to a depth of up to 5 microns, in particular ranging from 0.5 to 1.5 microns.

As indicated above, the increase in density is measured by X-ray reflectometry; this measurement is best carried out over a depth of at most 1 micron, more particularly at most 500 nanometers. This does not at all mean that the surface densification is limited to such a depth.

The surface densification treatment is especially a fluorination or oxyfluorination treatment which results in the formation of a concentration gradient of fluorine atoms from the surface toward the interior of the material.

In particular, the concentration of fluorine atoms, determined by SEM-EDS (Scanning Electron Microscopy & Energy Dispersive System), is at least 0.25 fluorine atoms, generally 0.25 to 8 fluorine atoms, especially 0.25 to 5 fluorine atoms and in particular 0.33 to 1.5 fluorine atoms per repeat unit:

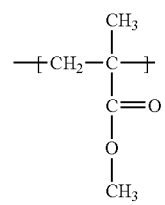

in the outermost surface layer of the material (the term "outermost surface layer" is understood to mean a depth of a few nanometers from the surface).

Such a fluorination or oxyfluorination treatment therefore results in certain monomer unit hydrogens of the constituent polymer of the sheet being substituted with fluorine. The groups resulting from the fluorination (or oxyfluorination) treatment, namely —CF—, —CF$_2$— and —CF$_3$ are clearly identified by XPS (X-ray photospectroscopy) at 287.9 eV, 290.8 eV and 293.7 eV, respectively.

In addition to introducing fluorine, the treatment makes it possible to create radicals and to form covalent bonds between the polymer chains. Densification of the material results from this "crosslinking" effect.

Without wishing to be tied by any particular theory, it is believed that the introduction of fluorine—for which water has little affinity—reduces the extent to which water "dissolves" in the sheet and that the diffusion of water is prevented insofar as the compacting of the surface has tightened the lattice through which the water has the possibility of diffusing. The absorption/desorption phases described above are therefore reduced in intensity. Correspondingly, H$_2$SO$_4$ no longer having its carrier for penetrating into the sheet cannot induce crazing, as was described above.

Moreover, the surface fluorination or oxyfluorination treatment results in a substantial fluorine concentration gradient in the thickness of the sheet. The optical properties of the latter are not affected, as would be the case with an external film or varnish which forms a sudden and sharp boundary in the thickness of the sheet. This would also be the case with a material coextruded with an outer layer of higher density.

The present invention also relates to a process for manufacturing a surface-modified sheet material as defined above, characterized in that one or more sheets based on a methyl methacrylate homopolymer or copolymer undergo a surface fluorination or oxyfluorination treatment by a gas mixture consisting of F$_2$ or NF$_3$ or ClF$_3$ (preferably F$_2$)+carrier gas such as helium, N$_2$ and CO$_2$, when appropriate in the presence of residual oxygen from the air, in a reaction chamber until the desired increase in the density has been obtained.

These treatments are known per se and described for example in European patent applications EP-A-502 303 and EP-A-629 654 to which the reader will refer for further details.

According to a first possible method of implementation, a fluorination/perfluorination cycle is carried out in the following manner:

- a vacuum is created in the reactor, in which the parts to be treated are placed;
- the reactor is isolated from the pumping circuit and an $N_2/F_2$ mixture is introduced thereinto until the pressure reaches 250 to 300 mbar;
- the parts are left in contact with the mixture for a period of time ranging from 10 to 60 minutes depending on the desired depth of surface treatment;
- after the treatment, a first purge is carried out in order to remove almost all the fluorine that has not reacted, followed by further purges with the introduction of air before the reactor is opened.

According to a second possible method of implementation, an oxyfluorination cycle is carried out in the following manner:

- the air pressure in the reactor, in which the parts to be treated are placed, is lowered to about 200 mbar;
- the reactor is isolated from the pumping circuit and an $N_2/F_2$ mixture is introduced thereinto until the pressure reaches 350 to 400 mbar;
- the parts are left in contact with the mixture for a period of time ranging from 10 seconds to 3 minutes depending on the desired depth of surface treatment;
- after the treatment, a first purge is carried out in order to remove almost all the fluorine that has not reacted, followed by further purges with the introduction of air before the reactor is opened.

Mechanical properties, the abrasion resistance (Taber hardness), the aging behavior, the temperature aging behavior (90 day/80° C. storage test), UV aging behavior, the hydrophilicity and the hydrophobicity (wetting angle) are not modified by the surface fluorination or oxyfluorination treatment.

Nor is the color of the sheets modified ($a^*=0.03$, $b^*=0.12$ in the case of PMMA). In all cases, the haze remains very much less than 2%.

The light transmission may be increased by at least 4% because of an antireflection effect resulting from the treatment. The optical index of untreated PMMA is between 1.47 and 1.51. After treatment, this index is surface-modified and depends on the local concentration of incorporated fluorine atoms. If an average fluorine concentration at the surface of the PMMA is considered (optical monolayer assumption), an index of 1.39 to 1.42 is obtained.

The fluorination or oxyfluorination treatment provides the further advantage of introducing fluorine which improves the bonding strength of the material. This proves to be useful for keeping the sheets in place in the peripheral seats of the glazing.

The present invention also relates to crazing-resistant glazing by densification of the surface intended to be exposed to the external atmosphere, especially aircraft glazing, incorporating the material as defined above. (In practice, the above process will result in the fluorination of both the inner and outer surfaces. The fact that the inner surface is also fluorinated causes no problem).

Hydrophobic or solar-protection functionalities by means of an Ag/Au layer or a polyethylene terephthatate (PET) film, may be conventionally introduced into this glazing.

The present invention also relates to a process for the manufacture of glazing as defined above, especially the outer panel of an airplane window, characterized in that a base sheet of methyl methacrylate homopolymer or copolymer is cut into several individual sheets intended to form the glazing and in that each individual sheet undergoes a drawing operation, a fluorination or oxyfluorination treatment as defined above being carried out before cutting, or before drawing or after drawing.

The present invention also relates to a process for restoring aircraft glazing, characterized in that the outer layer of the sheet constituting the glazing to be restored, by a mechanical polishing treatment to a depth of 0.3–0.7 mm, is removed and then said sheet undergoes the fluorination or oxyfluorination treatment as defined above.

Finally, the present invention relates to a process allowing a monolithic sheet material based on a methyl methacrylate polymer to be made crazing-resistant and/or its bonding strength to be improved, characterized in that the methyl methacrylate polymer is selected from among methyl methacrylate/fluorinated comonomer(s) copolymers, methyl methacrylate polymers treated by immersion in a solution of anhydrous hydrofluoric acid or of a salt chosen from NaF, KF, LiF and $CaF_2$, followed by an electrolytic fluorination reaction (cf. JP-61-162 008), and methyl methacrylate polymers surface-treated by the fluorination or oxyfluorination process as described above.

The fluorinated comonomers are for example those indicated above, their content in the copolymer being adjusted in order to obtain the desired increase in density or the desired improvement in bonding strength. In this case, fluorine is detectable throughout the thickness of the material and not only on the surface.

The following examples illustrate the present invention without however limiting the scope thereof.

EXAMPLE 1

Manufacture of the Outer Panel of a Crazing-Resistant Window

A window conventionally comprises two drawn PMMA panels which are placed opposite each other at a certain distance apart and which are held together by a peripheral seal made of an elastomer, by which the window is intended to be fitted into the metal fuselage of the airplane. The outer panel has the form of a relatively thick sheet, the peripheral border of which is beveled. The inner panel consists of a thinner sheet than the outer panel. The two panels are domed, the concavity facing inward.

Outer panels 44 cm×27 cm in length and 3 cm in thickness were cut from a PMMA sheet and subjected to the conventional drawing treatment.

The surface oxyfluorination of these panels was carried out using an $N_2/F_2$ mixture containing 5% or 25% $F_2$, for various treatment times (2, 5, 10, 15, 20 minutes) and under the conditions defined above.

Figure 2:
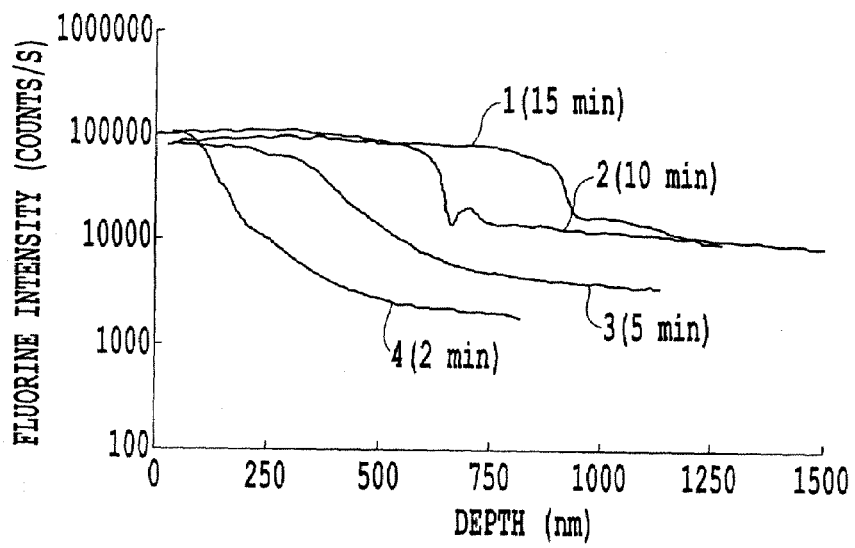

A fluorine SIMS analysis was then carried out on the fluorinated specimens, the curves obtained being given in FIGS. 1 and 2 ($F_2$ concentration of 5% and 25%, respectively).

EXAMPLE 2

Artificial Aging Test on Windows

"Star crazing test": S7.8 ASTM Meeting 1995, Oklahoma

In this test, the outer panels having the following characteristics were tested:
  A300 outer panel made of drawn PMMA, produced by Saint-Gobain Sully
  A300 outer panel made of PMMA fluorinated according to the process described in example 1 using an $N_2/F_2$ mixture containing 10% $F_2$, for a treatment time of 60 minutes under standard conditions.

The "star crazing test" comprises four phases:

(1) immersion of the panel in a bath of demineralized water at 71° C. for 5 hours followed by relaxation of the panel at room temperature for 30 minutes;

(2) after having affixed a mask (adhesive protection) over approximately ¼ of the area of the panel, spraying at room temperature of a 7 wt % $H_2SO_4$ solution over the entire surface of the panel (formation of droplets 3 to 5 mm in diameter distributed over the entire surface);

(3) continuous stressing in a vacuum (650 to 680 mbar) in the tooling suited to the dimensions of the window for 12 hours at room temperature (sealing provided by the windows gray seal).

After the test on the drawn PMMA panel, the presence of small spherical regions 2 to mm in diameter, in which streaks oriented in all directions are concentrated, were observed. Outside these regions, the presence of numerous streaks also oriented in all directions was observed.

On the fluorinated PMMA panel, no crazing was observed after 16 hours. The vacuum treatment was then continued. After 64 hours, no crazing was observed.

The invention claimed is:

1. A method of restoring the microcrazed surface of an aircraft glazing, comprising:
  mechanically polishing the microcrazed surface of a polymethyl methacrylate or a copolymer of methyl methacrylate glazing to a depth of 0.3 to 0.7 mm; and then subjecting the polished surface to a fluorination or oxyfluorination treatment.

2. The method as claimed in claim 1, wherein the mechanically polished surface of the microcrazed surface of the glazing that is formed from methyl methacrylate homopolymer or copolymer is densified to a depth ranging from 0.5 to 1.5 microns.

3. The method as claimed in claim 1, wherein the surface fluorination or oxyfluorination treatment is a treatment of the surface of the glazing formed from methyl methacrylate homopolymer or copolymer with fluorine which results in the formation of a concentration gradient of fluorine atoms from the surface of the glazing toward the inside of the glazing.

4. The method as claimed in claim 3, wherein the concentration of fluorine atoms, determined by SEM-EDS, is at least 0.25 fluorine atoms per repeat unit:

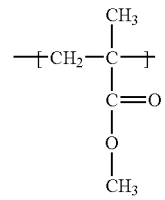

in the outermost surface layer of the material.

5. The method as claimed in claim 4, wherein the concentration of fluorine atoms, determined by SEM-EDS, is 0.25 to 8 fluorine atoms per methacrylate repeating unit of the polymer in the outermost surface layer of the material.

6. The method as claimed in claim 5, wherein the concentration of said fluorine atoms, determined by SEM-EDS, is 0.25 to 5 fluorine atoms per methacrylate repeating unit.

7. The method as claimed in claim 6, wherein the concentration of said fluorine atoms, determined by SEM-EDS, is 0.33 to 1.5 fluorine atoms per methacrylate repeating unit.

* * * * *